United States Patent [19]

Humason et al.

[11] Patent Number: 4,522,864

[45] Date of Patent: Jun. 11, 1985

[54] DECALS AND PROCESS FOR MAKING SAME

[75] Inventors: Dan C. Humason, 1973 La Corta St., Lemon Grove, Calif. 92045; Mayleta Buchwitz, 124 Southern Rd., El Cajon, Calif. 92020, Theodore E. Higgins, El Cajon, Calif.

[73] Assignees: Dan C. Humason, Lemon Grove; Mayleta Buchwitz, El Cajon, both of Calif.

[21] Appl. No.: 183,217

[22] Filed: Sep. 2, 1980

Related U.S. Application Data

[63] Continuation-in-part of Ser. No. 72,907, Sep. 6, 1979, abandoned.

[51] Int. Cl.[3] .......................... B32B 3/00; B44C 1/16; C09J 7/02

[52] U.S. Cl. .................................... 428/201; 156/234; 156/240; 156/277; 427/149; 427/208.4; 428/202; 428/204; 428/211; 428/311.7; 428/343; 428/350; 428/352; 428/914

[58] Field of Search ............... 428/194, 195, 207, 914, 428/352, 343, 40, 318, 211, 202, 350, 204, 201, 311.7; 427/149, 208.4; 156/234, 236, 240, 249, 277

[56] References Cited

U.S. PATENT DOCUMENTS

| | | | |
|---|---|---|---|
| 1,627,407 | 5/1927 | Reese | 427/149 |
| 1,803,836 | 5/1931 | Bihr | 427/149 |
| 1,811,804 | 6/1931 | Poschel | 427/149 X |
| 2,578,150 | 12/1951 | Rathke | 427/149 X |
| 2,941,916 | 6/1960 | Akkeron | 427/149 X |
| 3,681,186 | 8/1972 | Findlay et al. | 427/149 X |
| 3,898,357 | 8/1975 | Miller et al. | 427/149 X |
| 4,060,643 | 11/1977 | Blanks | 428/207 X |
| 4,105,483 | 8/1978 | Lin | 156/236 X |
| 4,115,602 | 9/1978 | Bullard | 428/207 X |
| 4,175,151 | 11/1979 | Eppich et al. | 427/149 X |

*Primary Examiner*—Thomas J. Herbert, Jr.
*Attorney, Agent, or Firm*—Baker, Maxham, Callan & Jester

[57] ABSTRACT

The decal of the present invention is a combination of a multi-color offset printed design on an extremely thin, flexible, extensible film of water resistant material covering a water soluble slip layer carried by porous decal paper and a uniform deposit of pressure sensitive adhesive covering the design and adapted to hold the design against skin and protect it from disruption during application to a skin surface. The process of the invention enables rapid manufacture of the novel multi-color decal by offset lithograph printing of a multi-color design through the combination of the steps of forming an extremely thin, water resistant film on a water soluble slip layer carried by decal paper, offset printing the design on that film and thereafter depositing on the printed design a pressure sensitive adhesive in a liquid vehicle which is a non-solvent for the film.

6 Claims, 4 Drawing Figures

DECALS AND PROCESS FOR MAKING SAME

This application is a continuation-in-part of application Ser. No. 072,907, filed Sept. 6, 1979, now abandoned.

BACKGROUND OF THE INVENTION

The present invention relates to improved decals for application to skin to simulate a true tattoo and to a process for making the same.

Decals for application to the skin have been made by a silk screen process in which color is deposited in a selected design on the slip layer of decal paper by wiping the color through the pores of a mesh cloth. A separate hand operation is required for deposition of each color and it has not been possible to insure the desired degree of register accuracy particularly becaus of the give and stretch of the screen.

In addition to the slowness and expense of the silk screen process, the decals so produced have necessarily been artificial in appearance, particularly when secured to a skin surface. This is an unavoidable result of the thickness of the color layer, which is determined by the thickness of the screen through which the color is deposited. This deposit is incapable of the fine detail, tone gradation and other nuances of original art, i.e., a tattooed skin. Additionally, the thick color deposit tends to crack when subjected to flexing and stretching on skin.

Attempts to print decals on a lithograph offset press have heretofor been unsuccessful. Water soluble material from the slip layer of the decal paper has clogged the press dampening system and caused the soluble material to adhere to the blanket roller and consequently to disrupt the printed design. Additionally, this procedure required extensive and time consuming clean-up as well as damage to the press which might require replacement of the roller.

It is an object of the present invention to provide an improved decal for securing an extremely thin, flexible and extensible design element closely simulating an actual tatoo when applied to the skin of a user.

It is a further object of the invention to provide a simple inexpensive process for making the decal including an offset printing step in which difficulties caused by water soluble material from the slip layer of the decal paper are avoided.

SUMMARY OF THE INVENTION

The decal of the present invention provides these advantages through the novel combination of a multi-color offset printed design on an extremely thin, flexible, extensible, film of water resistant material covering the water soluble slip layer carried by the decal paper and a uniform deposit of pressure sensitive adhesive on the exposed face of the design.

The process of the invention enables the rapid manufacture of the novel decal by offset printing while maintaining the integrity of the printed design through the combination of the steps of forming an extremely thin, water resistant film on a water soluble slip layer carried by the decal paper, offset printing a multi-color design on that film and thereafter depositing on the printed composite a pressure sensitive adhesive in a liquid vehicle which is a non-solvent for the film.

BRIEF DESCRIPTION OF THE DRAWING

The invention will be described in connection with the drawings in which.

DESCRIPTION OF THE PREFERRED EMBODIMENT

Figure 1:
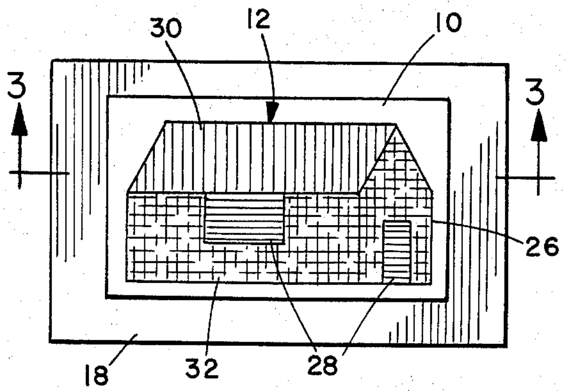
FIG. 1 is a plan view of a complete decal including the design pressure sensitive adhesive supporting paper and a water soluble slip layer.
Figure 2:
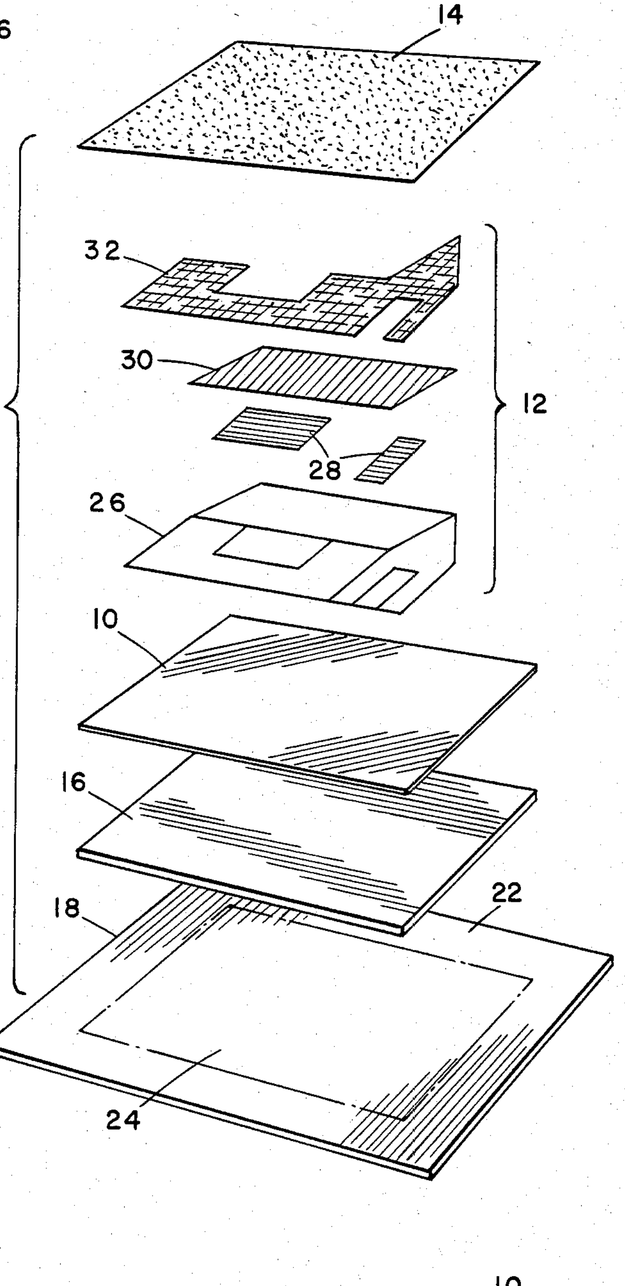
FIG. 2 is an exploded perspective view of the layers of the decal of the present invention.
Figure 4:
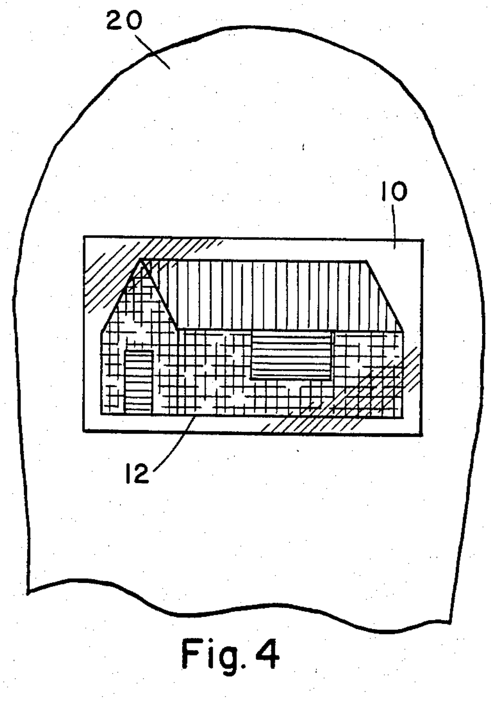
FIG. 4 is a perspective view of an applied decal design.

The decal of the present invention as shown in FIGS. 1 and 2 is capable of application to skin or other flat surface to provide a close simulation of an actual tattoo through the combination of an extremely thin, flexible, extensible, matte surfaced film 10 on which is imprinted a multi-color offset lithograph design 12 and which carries a pressure sensitive adhesive layer 14 on its printed side and is supported by a water soluble slip layer 16 and decal paper 18 on its other side.

As explained below, for the intended use of the present decal, the film 10 and imprinted design 12 are preferably so thin that they would be disrupted in a conventional decal application procedure. But in the present relation, the decal paper 18 and slip layer 16 protect the film 10 and lithograph design 12 until they are actually secured in place on the skin 20 of the user; and the pressure sensitive adhesive 14 enables the printed film 10 to be secured in place while its integrity is protected by the decal paper 18. Thereafter, the pressure sensitive adhesive layer 14 holds the film 10 and multi-color lithographed design 12 against the skin 20 so that it is not disrupted by stresses generated in wetting and removing the paper 18 and slip layer 16 and in wiping off any residual material. Finally, the film 10 protects the printed design 12 during the time it is in place on the skin 20 so that the skin surface and applied film 10 and design 12 may be washed using mild detergents such as soap. The film 10 and design 12 may be removed when desired using an appropriate solvent.

Figure 3:
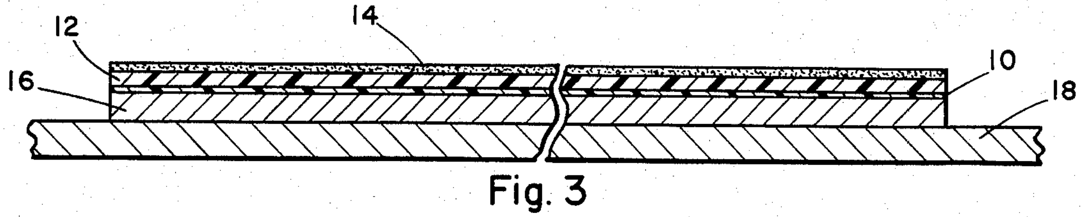
FIG. 3 is an enlarged sectional view taken on line 3—3 of FIG. 1.

Extreme thinness of the film 10 and lithographed design 12 are important to make the film 10 less noticeable and to obtain a translucency of the design 12 such that the color of the skin 20 beneath the decal blends with the color of the design 12 as indicated in FIG. 3 to simulate an actual tattoo and the design 12 seems to be part of the skin 20 to which it is affixed. But even more importantly this thinness is needed to enable the film 10 and design 12 to flex and stretch with the skin 20 without cracking and to minimize stresses tending to separate the film 10 and design 12 from the skin 20 through disruption of the pressure sensitive adhesive bond to the skin.

It is also important that the multi-color design 12 be formed by the offset lithograph process, not only because of the thinness of the printing layer obtainable by this process, but also because of the precise registration of the color elements of the design 12 which enable delicate shading, subtle nuances of color and translucency characteristic of actual tattoos.

For manufacture of the decal, a coating of a solution of dispersion of water soluble material is sprayed or otherwise applied to one surface 22 of a base sheet of decal paper 18 and dried to form a slip layer 16. The area 24 of decal paper 18 coated is preferably limited to the general area which will receive the design 12.

Thereafter, the coated area 24 and, prefereably the remaining area also, of this face 22 of the paper 18 are coated lithographically with a very thin film 10 of a water resistant, flexible, extensible material. The film 10 is microscopically thin, preferably no thicker than necessary to resist penetration of water to the slip layer 16 and paper 18. A suitable film material is the material commercially available as a standard "offset overprint varnish" but other natural or synthetic materials such as, resin solutions having the necessary covering an water resistant properties may be used.

Printing of a selected design 12 may employ normal procedures of multi-color offset printing either with the dampening system engaged (in combination with a nylon printing plate) or disengaged, since the film 10 protects the water soluble slip layer 16 against any wetting agent to which the paper 18 may be exposed during the printing process and protects the paper 18 against curling from exposure to printing agents.

In making the decal shown, the application of, for example, black ink for the outline 26, blue ink for the door and window area 28, red ink for the roof 30 and yellow for the wall area 32 can be accomplished by various passes on a standard lithographic offset press or by a single press if it is capable of multi-color operation.

Pressure sensitive adhesive is next applied over the printed design in a liquid vehicle non-solvent for the inks of the design 12 and the water resistant film 10. A preferred adhesive is an aqueous emulsion of vinyl-acrylic copolymer such as the material known as Borden adhesive "ED-9306. "It is important that the adhesive layer 14 be uniform, and applicant has found that an adhesive layer 14 having superior characteristics in the present relation is secured by application of the emulsion by a silk screen procedure.

The adhesive is deposited in a thin, extremely uniform substantially invisible layer, which, after drying, is uniform and which does not cause perceptible optical interference between the design and a skin surface to which the decal is secured. After the screen is removed and the adhesive is dried, the decal is ready for use.

Application of the decal to skin or other surface 20 is effected by pressing the adhesive surface of the decal firmly against a clean skin surface 20 to establish pressure sensitive adhesive engagement. Water is applied to the decal paper 18 to wet it and to soften or dissolve the slip layer 16 and the paper and other residue are removed leaving the design 12 in place. During application, the integrity of the design 12 is maintained by its association with the decal paper 18 until the design unit is adhered to the skin 20. When the design unit is in place, the thin water resistant film 10 protects the design 12 during removal of slip layer residue and also against disruption by mild abrasion or by repeated washings. The decal design can be removed easily with an appropriate solvent such as alcohol.

The following example is given as of possible assistance in understanding the invention but it is to be understood that the invention is not limited to the particular materials or procedures employed in the example.

EXAMPLE

A multi-color decal in accordance with the present invention is prepared by spraying an aqueous solution of conventional water soluble gum based slip layer material on those areas 24 of one face 22 of a decal base paper 18 which will receive the design 12 and drying the sprayed coating to form a slip layer 16. Thereafter, the slip coating 16 and remaining areas of the face 22 of the decal paper 18 are coated with extremely thin water resistant film 10 of standard "offset overprint varnish."

An offset lithograph press with nylon printing plate was set up with the dampening system engaged and the decal paper 18 with its applied water soluble slip layer 16 and thin water resistant film were subjected to imprint successively: (1) printing of a black outline 26 using Gans Ink formula #60756 simultaneously with blue door and window areas 28 using Gans Ink process blue #61704; (2) printing over the blue/black combination with red on the roof area 30 using Gans Ink #61703; and (3) finally printing the wall area 32 yellow with Gans Ink #61702.

A deposit of pressure sensitive adhesive was then applied to the printed surface using a slik screen #310 and forcing a commercial aqueous vinyl-acrylic copolymer emulsion diluted by addition of 20% water to a viscosity which passes easily through the mesh of the screen and drying the deposited emulsion to form a uniform layer 14 of the copolymer adhesive.

We claim:

1. A multi-color decal comprising a porous paper backing, a water soluble slip layer on one surface of said paper, a mircroscopically thin, flexible, extensible, water resistant film covering said slip layer, a very thin translucent multi-color design offset printed on said water resistant film and a uniform layer of transparent or translucent pressure sensitive adhesive covering said design.

2. A multi-color decal as defined in claim 1 in which said slip layer is restricted to the general area occupied by said design.

3. A multi-color decal as defined in claim 2 in which said water resistant film covers substantially the entire area of said one surface of said paper.

4. A multi-color decal as defined in claim 3 in which said film is matte surfaced.

5. A multi-color decal suitable for application to the skin comprising:

(a) a porous decal paper backing;
(b) a water-soluble slip layer applied to one surface of the backing;
(c) a very thin, flexible, extensible, water-resistant film covering said slip layer;
(d) an offset printed multi-color design applied over said water-resistant film; and
(e) a transparent pressure sensitive adhesive covering the design;

the slip layer being limited to the general area to be covered by the design and the water-resistant film covering substantially the entire area of one surface of the decal paper.

6. A process for producing a multi-color decal suitable for application to the skin comprising the steps of:

(a) coating one side of a porous decal paper backing with a water-soluble slip layer;
(b) coating the water-soluble slip layer with a very thin, flexible, extensible, water-resistant film;
(c) offset printing a multi-color design on the water-resistant film; and
(d) coating the design with a transparent, pressure sensitive adhesive;

the slip layer being limited to the general area to be covered by the design and the water-resistant film covering substantially the entire area of one surface of the decal paper.

* * * * *